United States Patent [19]
Gotou

[11] Patent Number: 5,715,114
[45] Date of Patent: Feb. 3, 1998

[54] MULTI-PIECE HUB FOR SUPPORTING RECORDING DISKS IN A HARD DISK DRIVE

[75] Inventor: Tsutomu Gotou, Hagashine, Japan

[73] Assignee: Fujitsu Limited, Kawasaki, Japan

[21] Appl. No.: 340,798

[22] Filed: Nov. 16, 1994

Related U.S. Application Data

[63] Continuation of Ser. No. 33,506, Mar. 18, 1993, abandoned.

[30] Foreign Application Priority Data

Mar. 18, 1992 [JP] Japan ................. 4-062007

[51] Int. Cl.$^6$ .................................................. G11B 17/028
[52] U.S. Cl. .................................................. 360/98.08
[58] Field of Search ........................ 360/135, 98.01, 360/98.07, 98.08, 99.05, 99.12; 369/271, 282

[56] References Cited

U.S. PATENT DOCUMENTS

| | | | |
|---|---|---|---|
| 5,048,005 | 9/1991 | Ekhoff | 369/271 |
| 5,243,481 | 9/1993 | Dunckley et al. | 360/98.08 |
| 5,303,098 | 4/1994 | Yamamori et al. | 360/99.12 |

FOREIGN PATENT DOCUMENTS

| | | |
|---|---|---|
| 62-8357 | 1/1987 | Japan . |
| 421982 | 1/1992 | Japan . |

OTHER PUBLICATIONS

King et al., "Spindle For Flexible Membranes", IBM Tech Disc. Bull, vol.18, No. 2, Jul. 1975 pp. 523–524.

Primary Examiner—Robert S. Tupper
Attorney, Agent, or Firm—Greer, Burns & Crain, Ltd.

[57] ABSTRACT

A disk assembly includes a disk as a recording medium having a center hole whose center hole defines an inner cylindrical surface. The disk is provided with a first mating portion such as a chamfered end at the inner cylindrical surface, and a hub structure to be connected with the inner cylindrical surface of the recording medium. The hub structure has a plurality of divided hub members inside the center hole, the hub member being formed by dividing the hub structure fanwise by a predetermined angular pitch. The hub members are provided with a second mating portion, typically a groove, at a location opposed to the first mating portion, wherein the hub members support the disk by fitting the second mating portion into the first mating portion.

21 Claims, 6 Drawing Sheets

MULTI-PIECE HUB FOR SUPPORTING RECORDING DISKS IN A HARD DISK DRIVE

RELATED APPLICATION

This is a continuation of application Ser. No. 08/033,506, filed on Mar. 18, 1993 now abandoned.

BACKGROUND OF THE INVENTION

1. Field of the invention

This invention relates to a disk assembly structure to support a recording disk, and more particularly, to a multi-piece hub for supporting recording disks in a hard disk drive.

2. Description of the Related Arts

Figure 1:
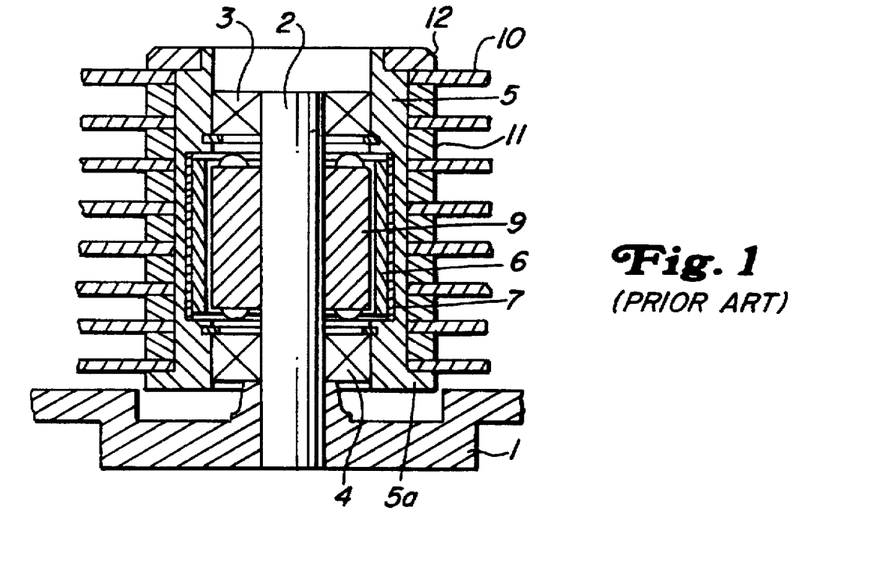
FIG. 1 schematically illustrates a cross-sectional view of a typical prior art structure of a disk drive apparatus.

FIG. 1 schematically illustrates a typical conventional structure of a disk assembly to hold a plurality of magnetic recording disks 10 in a disk drive. A spindle hub 5, which is also an outer cover of a spindle motor, is rotatably mounted via bearings 3 and 4 on an axle 2, which is studded on a base 1. Spindle hub 5 is cylindrical, whose inside wall of which is provided with a permanent magnet 6 and yoke 7 to form a rotor of the spindle motor. A stator of the spindle motor is formed of a coil 9 mounted on axle 2, between two bearings 3 and 4. A lower end of spindle hub 5 is provided with a flange 5a, on which a plurality of magnetic recording disks 10 and a plurality of spacers 11 are alternately stacked. A clamp 12 provided at the top of spindle hub 5 pushes the disks and the spacers towards the flange.

A problem in this prior art structure is that the thickness and parallel alignment of each spacer and disk must be precisely controlled because the axial location of the stacked disks is determined by the accumulation of the thicknesses of the disks and spacers. If the axial location of the disks is not correctly controlled the gap between the disk surfaces and the respective heads cannot be properly controlled. Another problem is that heat generated during operation may cause the stack to lose tightness, resulting in deterioration of the axial location accuracy as well as parallel alignment of the disks. Still another problem is that the radial width of the spacer occupies memory area of the disk surface. A further problem is that the structure requires many precise assembling parts, i.e. the spacers, causing an increase in assembling time and, accordingly, production cost.

SUMMARY OF THE INVENTION

It is a general object of the invention to provide a simple and accurate hub structure for magnetic recording disks in a hard disk drive where a lower number of precise assembling parts are required.

It is another object of the invention to provide a hub structure for magnetic recording disks in a hard disk drive which is relatively tolerant of thermal changes.

It is still another object of the invention to provide an increased recording area on the disks in hard disk drives.

A hard disk drive according to the present invention includes at least one recording disk having a center hole provided with a first mating portion around the periphery of the hole, typically formed of chamfered edges; and a hub means for holding and rotating the disk at the center hole, where the hub means is typically formed of plural hub members cut along the axial direction of the hub means, an outer cylindrical surface of the hub members is provided with a second mating portion typically formed of a groove, and is smaller than the inner periphery of the center hole of the disk when the hub members are radially pulled in towards an axis of the hub means. The groove fits with the first mating portion of the disk center hole when the hub members are radially extended.

The above-mentioned features and advantages of the present invention, together with other objects and advantages, which will become apparent, will be more fully described hereinafter, with references being made to the accompanying drawings which form a part hereof, wherein like numerals refer to like parts throughout.

DESCRIPTION OF THE PREFERRED EMBODIMENT

Figure 2:
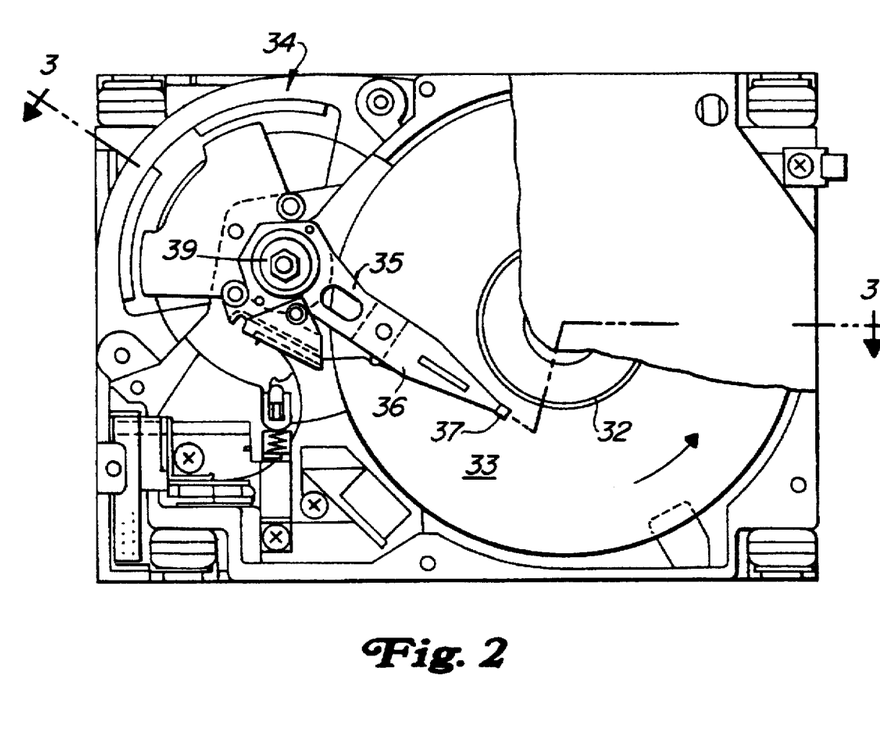
FIG. 2 schematically illustrates a partially cut plan view of a disk drive apparatus to which the present invention is applicable.
Figure 3:
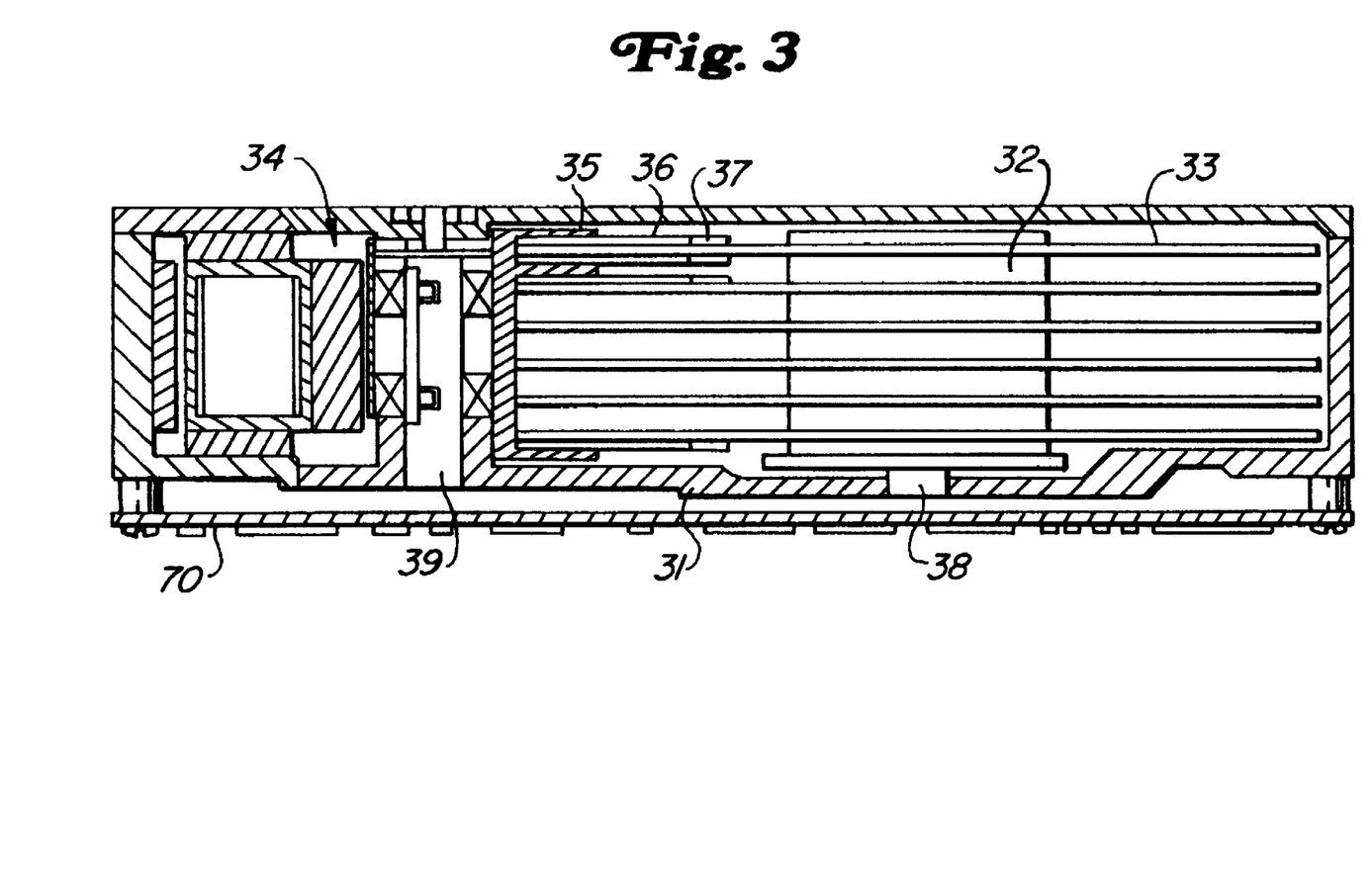
FIG. 3 schematically illustrates a cross-sectional view cut along line 3—3 of the FIG. 2 apparatus.

Referring to FIGS. 2 and 3, magnetic hard disk drive apparatus is shown in which the present invention can be embodied. A base 31 of the drive apparatus is also a part of an enclosure of the apparatus. A spindle hub 32 which is a part of a rotor of a motor is rotatably installed on base 31. Five magnetic hard disks 33, referred to hereinafter as disks, are installed on spindle hub 32. Magnetic heads 37 are provided to magnetically read/write data on the disk surfaces. An actuator 34 rotates the heads via arms 35 and spring arms 36, made of a resilient material, around a shaft 39 so that the heads cross magnetic tracks coaxially or spirally formed on the disks. A printed circuit board 70 typically carries a servo control circuit for tracing a particular track on the disk, a recording circuit to drive magnetic heads 37 and a read circuit to reproduce the data from magnetic heads 37.

Figure 4:
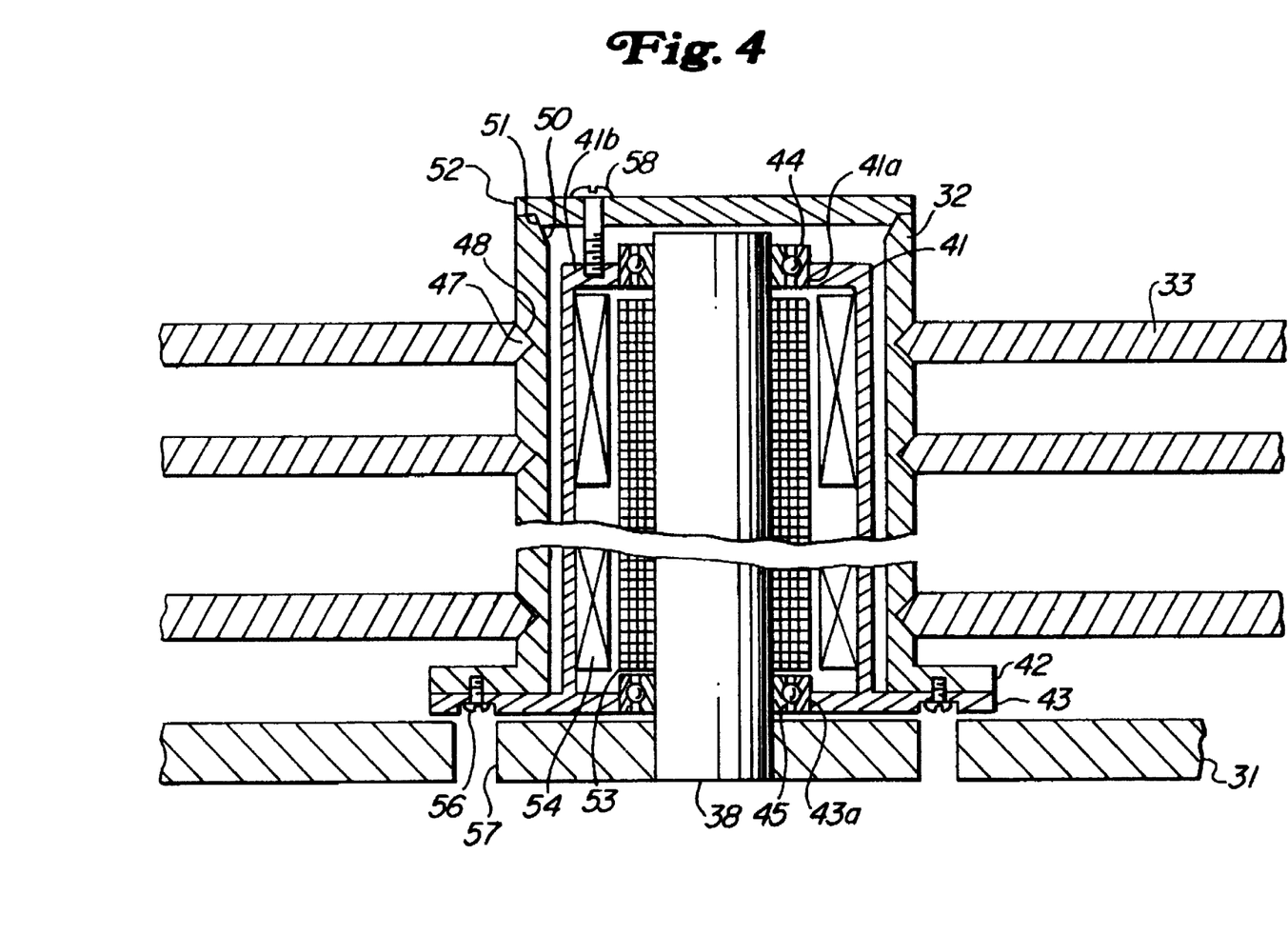
FIG. 4 schematically illustrates a cross-sectional view of a first preferred embodiment of the present invention.
Figure 5:
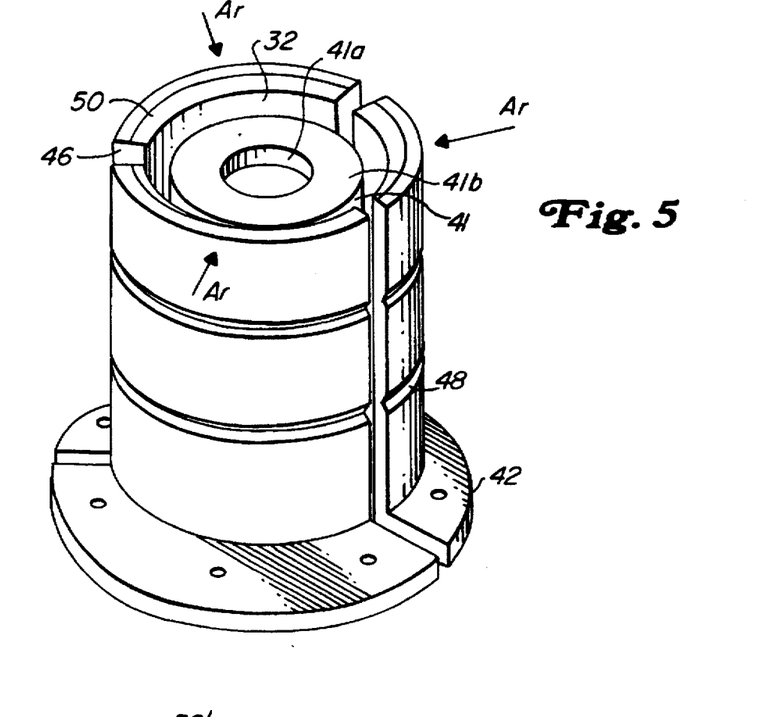
FIG. 5 schematically illustrates a perspective view of a spindle hub used in the first preferred embodiment of FIG. 4.

Referring to FIGS. 4 and 5 a first preferred embodiment of the present invention is hereinafter described.

An axle 38 which supports a stator of the spindle motor is studded on base 31. A stator coil 53 is mounted around axle 38. A motor cover 41 in the shape of a 17 mm diameter cup and made of steal has an end plate 43 and its lower end having a center hole 43a, and has a top end 41b at its upper end and having a center hole 41a. Motor cover 41 is rotatably installed, via end plate 43 and bearing 44 fitted in upper hole 41a and bearing 45 fitted in lower end 43a, onto axle 38. Permanent magnets 54 are provided inside the motor cover 41 to face the stator coil 53, so as to form a rotor of the spindle motor. A spindle hub 32 is formed of an aluminum cylinder of 26 mm diameter, 35 mm long and 1.5 mm thick, provided with circular grooves 48 on its cylindrical surface spaced by a predetermined distance, for example 3 mm spacing. The groove is in a V shape, for example 45° and 1 mm deep. The cylinder also has a flange 42 on its lower end. The cylinder portion and the flange together are axially cut into, for example, three pieces by, for example, 2.5 mm wide slots 46.

Magnetic recording disks 33 made of, for example, 3.5" (95 mm) diameter and 1.27 mm thick aluminum plates coated with magnetic material, referred to hereinafter as disks, are prepared so that inner edges 47 of each center hole of 25 mm diameter is triangulated by the same angle as the V shape grooves on outer cylinder 40, i.e. 45° for this case.

Assembling procedure of disks on the spindle hub 32 is hereinafter described in detail. The three pieces forming the spindle hub 32 are placed on end plate 43 so that the inner walls of the spindle hub 32 are pressed as indicated by arrows Ar (FIG. 5) so as to contact the outer surface of motor cover 41 by the control of a first tool, which is not shown in the figure. Next, disks 33 are inserted over spindle hub 32 until the inner periphery of each disk comes in front of each groove 48 with a second tool, which is not shown in the figure. Next, each piece of the spindle hub 32 is pushed outwards by the use of a third tool which is not shown in the figure, as well as a top 52 having a typically 45° tapered edge 51. The top 52 is axially fit with an inner tapered end 50 of spindle hub 32 so that the inner edges of the center hole of the disk and the groove are engaged with each other while each piece of the spindle hub precisely keeps concentric with axle 38 as well as parallel with each other. Top 52 is fixed by screws 58 in top end 41b of motor cover 41. Each of the pieces of spindle hub 32 is fixed to the end plate 43 by screws 56 through holes 57 provided on base 31. After the assembling procedure is completed holes 57 are sealed in order to prevent an air flow therethrough (not drawn in the figure).

Figure 6:
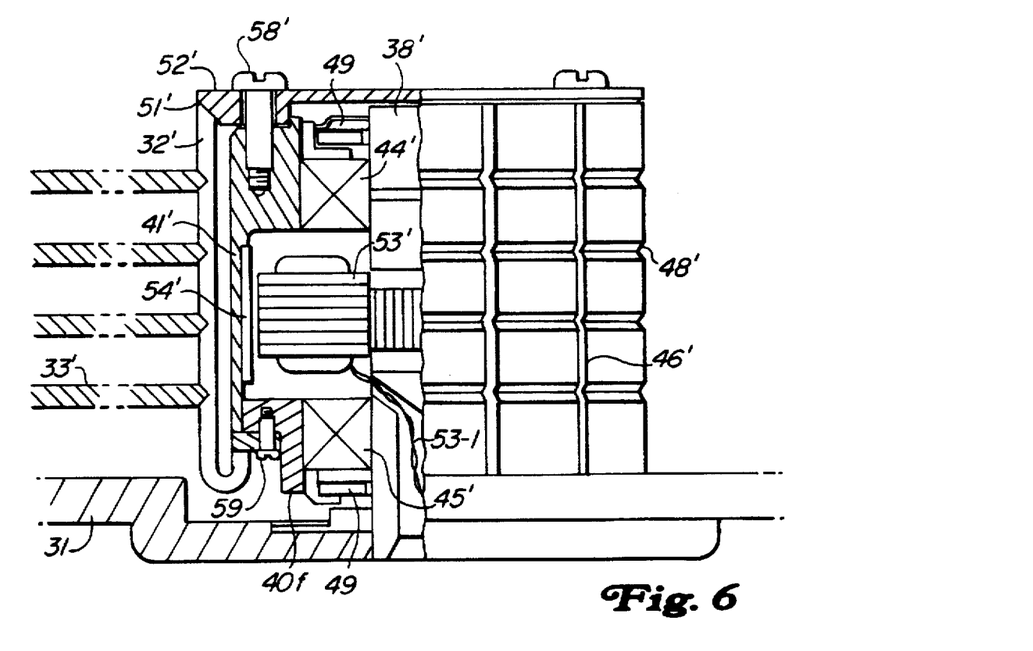
FIG. 6 schematically illustrates a cross-sectional view of a second preferred embodiment of the present invention on the left hand half, as well as an outline view of the spindle hub thereof on the right hand half.
Figure 7:
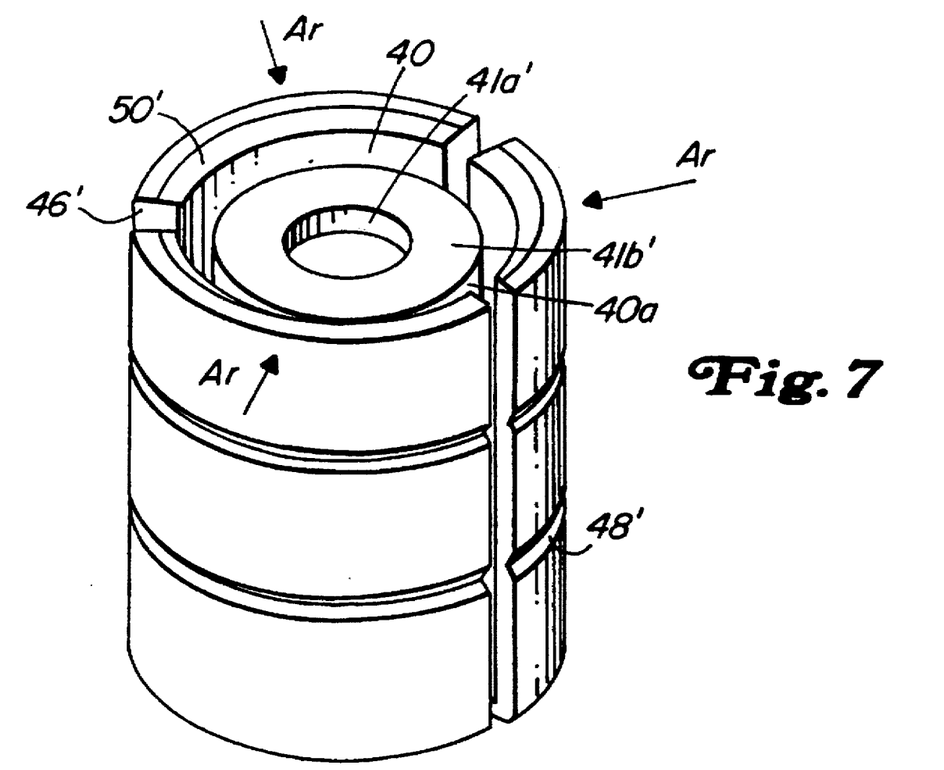
FIG. 7 schematically illustrates a perspective view of a spindle hub used in the second preferred embodiment.

Referring to FIGS. 6 and 7, an assembling structure of a second preferred embodiment of the present invention is hereinafter described in detail. The second preferred embodiment is different from the first preferred embodiment in that the folded end of spindle hub 32 is connected via a ring 40f to motor cover 41'. An axle 38, which supports a stator coil 53' of a spindle motor, is studded on base 31 by, for example, being pressed into a hole provided there. Spindle hub 32' has a cylinder portion of 26 mm diameter, 35 mm high and 1.5 mm thick whose lower end is folded inwardly. The folded end is fixed by screw 59 onto ring 40f so that the spindle hub is concentric with the axis of axle 38. Motor cover 41' is formed of a 17 mm diameter steel cylinder. Motor cover 41' has a hole 41a' on its top end 41b' so as to be rotatably fixed via a bearing 44 onto an upper end of axle 38'. A lower end of motor cover 41' is rotatably fixed via ring 40f and bearing 45 on to axle 38. On the inner wall of motor cover 41' there are provided permanent magnets 54'. The outer surface of spindle hub 32' is provided with, for example, four circular grooves 48' in a V shape of, for example, 45° and 1 mm deep. An inner edge of an upper end of spindle hub 32' is tapered, for example 10° to 45° with respect to the axis of the cylinder in the similar way to a first preferred embodiment. A cylindrical portion of the spindle hub 32' is axially cut into ten pieces by ten slits 46', for example, 1.25 mm wide as shown in FIG. 5, so that the spring action of the cut cylinder portion allows the spindle hub 32' to be adequately shrunk inwardly.

Stator coil 53' is electrically driven via wiring 53-1 provided through axle 38'. An air seal 49 between the inside and the outside of the apparatus envelope is rotatably made with a widely employed magnetic fluid at the axial outsides of the two bearings 44' and 45'.

Assembling procedure of the disks onto the spindle hub is hereinafter described. The axially cut pieces of spindle hub 32' are pressed inwards by a fourth tool, which is not shown in the figure, as shown with arrows Ar (FIG. 7) until the outer diameter becomes smaller than the inner diameter of the center hole of the disks, owing to the flexibility of the axially cut spindle hub.

Next, disks 33 are supported by a fifth tool, which is not shown in the figure. The disks are inserted onto spindle hub 32' until the center hole of each disk comes correctly in front of corresponding groove 48. Then, the fifth tool releases its inward pressure so that spindle hub 32' resiliently returns back outwards until the inner edges of the center hole of the disks engage the grooves, respectively. A top 52' made of a thick disk, one of whose edges 51' is tapered by the same angle as the tapered end 50' of spindle hub 32', is inserted into the tapered end 50' so that the precisely fit tapers generate an outward expanding force of the outer cylinder. Top 52' is fixed by screws 58' in the axial direction onto top end 41b' of motor cover 41'. The outward force together with the precisely matched tapers 50' and 51' of the disk edge and the groove allow a precise location of each disk, i.e. an accurate axial location, accurate centering as well as accurate parallel alignment of the disks.

Figure 8A:
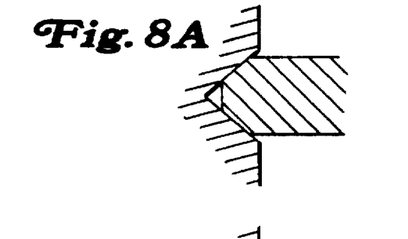
FIGS. 8(a) through 8(g) schematically illustrate cross-sectional views of alternative embodiments of the grooves in the hub and the inner edges of the disks in the embodiments of FIGS. 5 and 6.
Figure 8B:
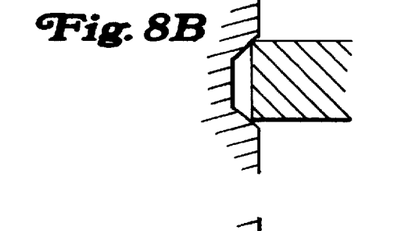
Figure 8C:
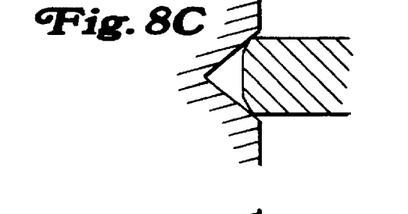
Figures 8D, 9:
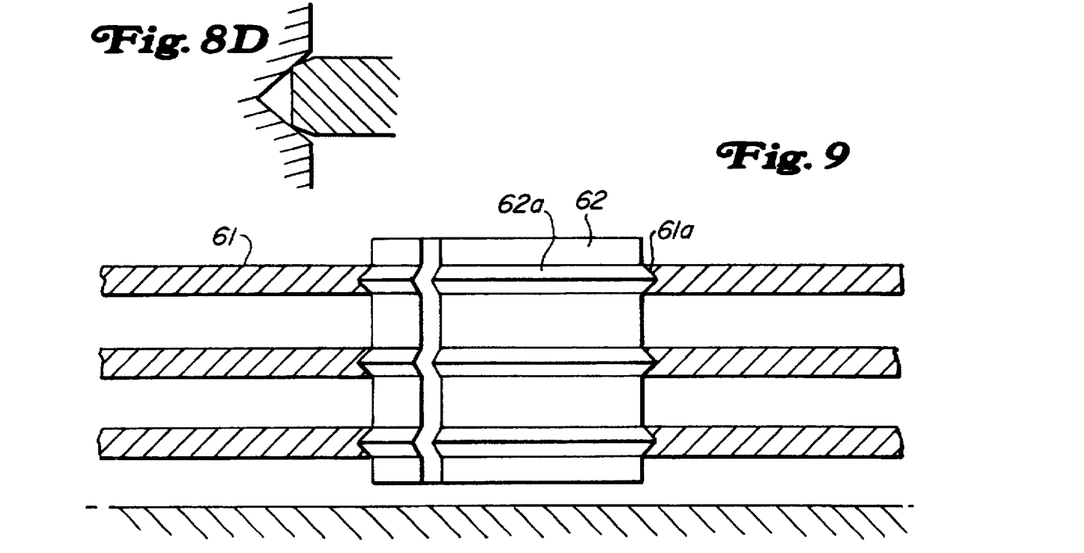
FIG. 9 schematically illustrates a cross-sectional view of a fourth preferred embodiment of the present invention.
Figure 8E:
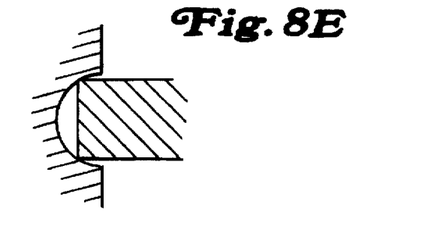
Figure 8F:
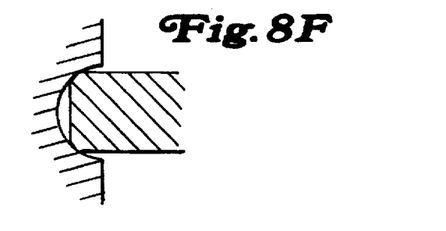
Figure 8G:
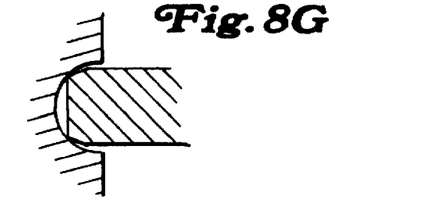

In FIGS. 8(a) through 8(g) there are illustrated, as third preferred embodiments, cross-sectional views of variations of the grooves and inner edges of the disk of the above first and second preferred embodiments. In FIGS. 8(a) to 8(d) the grooves are in V or other angular shape. In FIG. 8(a) the inner edges of the disk are in the V shape but its top is shallower than the groove bottom. In FIG. 8(b) the inner edges of the disk are square, not chamfered, so that the square edges determine the disk position. In FIG. 8(c) the inner edges of the disk are chamfered such that the chamfered edges on the disk surfaces sides contact the groove walls to determine the disk position. In FIG. 8(d) the inner edges of the disk are chamfered such that the chamfered edges on the inner top of the disk contact the groove walls to determine the disk position. The groove bottom may be made shallower than the V shape deepest end as representatively drawn in FIG. 8(b). In FIGS. 8(e) to 8(g) the bottoms of the grooves are round. In FIG. 8(e) the inner edges of the disk are square, not chamfered, so that the square edges determine the disk position. In FIG. 8(f) the inner edges of the disk are chamfered such that the chamfered edges on the disk surfaces sides contact the round bottom to determine the disk position. In FIG. 8(g) the inner edges of the disk are chamfered such that the chamfered edges on the inner top of the disk contact the round bottom so as to determine the disk position.

In the above-described structure of the present invention axial locations of the disks are determined only by the axial locations of the grooves. Even when thermal expansion occurs in the spindle hub, there is no problem from accumulation of expansions of the many parts, such as the prior art spacers. That is, there is caused no loose holding of the disks which may also deteriorate the concentricity as well as parallel alignment of the disks. Accordingly, the heads can always maintain good tracking of the magnetic tracks provided on the disk surfaces through the apparatus operations. In other words, there is no thermal off-track.

Referring to FIG. 9, a fourth preferred embodiment of the present invention is hereinafter described. The outer cylinder of spindle hub 62 is vertically cut into three pieces in the same way as the first preferred embodiment. However, outer cylinder 62 is provided with triangular circular protrusions 62a in place of grooves 48 of the first and second preferred embodiments. The angle of the triangle is chosen as, for example, 45°. In order to engage the protrusion 62a the inner periphery of disk 61 is grooved around the periphery with a 45° V shape for this case. The diameter of the top of the protrusion is such that when the outer cylinder is pressed inward the diameter of the outer cylinder is smaller than the center hole of the disk. Assembling procedure is the same as that of the first preferred embodiment. The shape of the groove and protrusion can be chosen in a similar way to those of FIGS. 8(a) through 8(g) in the third preferred embodiments, where the position of the grooves and the protrusions is interchanged from those of FIGS. 8(a) through 8(g). The structure of the fourth preferred embodiment provides the same advantageous effects of the first preferred embodiment.

In order to simplify the drawing (FIG. 5) in the above preferred embodiment there were referred to only three axial slits on the spindle hub. However, it is apparent that the spindle hub may be divided by more than three, for example by ten, according to a design choice, as drawn on the right hand half of FIG. 6. Then, each slit width may be smaller than that of the above preferred embodiments.

The diameter of the center holes of the disks employed in the disk drive apparatus has been standardized in the industry. Accordingly, in the present inventions, the deletion of spacers 11 employed in the FIG. 1 prior art structure allows more recording area on the disk surface than that of the prior art structure.

Though in the above preferred embodiments the magnetic disks and magnetic heads are referred to as examples, it is apparent that the present invention may be embodied in a disk drive including optical disks and optical heads.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications are equivalents may be resorted to, falling within the scope of the invention.

What I claim is:

1. A disk assembly, comprising:
    at least one recording medium having a center hole, said center hole defining an inner cylindrical surface, said recording medium being provided with a first mating portion at said inner cylindrical surface;
    a plurality of separate and distinct, radially movable hub members circumferentially arranged inside said center hole, said hub members cooperatively defining a hub structure extending radially from a rotational axis of said hub structure by a predetermined angular pitch, for retaining said inner cylindrical surface of said recording medium, said hub members each having a free first end and a fixed second end, said free end being flexibly movable inwardly toward said rotational axis, said hub members each being provided with a second mating portion at a location opposed to said first mating portion; and a top for fixing said free first end;
    wherein said hub members support said recording medium by fitting said second mating portion of said hub members into said first mating portion of said recording medium.

2. A disk assembly as recited in claim 1, wherein said first end of each said hub member is provided with a first tapered surface; and
    said top is provided with a second tapered surface so as to fit with said first tapered surface of said hub structure, said extending means expanding said hub members when said extending means is pushed inwardly along said rotational axis towards said hub structure.

3. A disk assembly as recited in claim 1, wherein said first mating portion is on the edge of said center hole of said recording medium.

4. A disk assembly as recited in claim 1, wherein said recording medium has a flat surface, and said first mating portion is chamfered at a first angle with respect to said flat surface.

5. A disk assembly, comprising:
    at least one recording medium having a center hole;
    said center hole defining an inner cylindrical surface;
    said recording medium being provided with a first mating portion at said inner cylindrical surface;
    a plurality of separate and distinct, radially movable hub members circumferentially arranged inside said center hole, said hub members cooperatively defining a hub structure extending radially from a rotational axis of said hub structure by a predetermined angular pitch, for retaining said inner cylindrical surface of said recording medium;
    said hub members each having a free first end and a fixed second end, said flee end being flexibly movable inwardly toward said rotational axis; and
    said hub members each being provided with a second mating portion at a location opposed to said first mating portion;
    wherein said hub members support said recording medium by fitting said second mating portion of said hub members into said first mating portion of said recording medium;
    wherein said recording medium has a flat surface, and said first mating portion is chamfered at a first angle with respect to said flat surface;
    wherein said second mating portion is a groove having walls tapered with said first angle.

6. A disk assembly, comprising:
    at least one recording medium having a center hole;
    said center hole defining an inner cylindrical surface;
    said recording medium being provided with a first mating portion at said inner cylindrical surface;
    a plurality of separate and distinct, radially movable hub members circumferentially arranged inside said center hole, said hub members cooperatively defining a hub structure extending radially from a rotational axis of said hub structure by a predetermined angular pitch, for retaining said inner cylindrical surface of said recording medium;
    said hub members each having a free first end and a fixed second end, said free end being flexibly movable inwardly toward said rotational axis; and
    said hub members each being provided with a second mating portion at a location opposed to said first mating portion;

wherein said hub members support said recording medium by fitting said second mating portion of said hub members into said first mating portion of said recording medium;

wherein said second mating portion is a round groove, and edges of said center hole contact said round groove.

7. A disk assembly, comprising:

at least one recording medium having a center hole;

said center hole defining an inner cylindrical surface;

said recording medium being provided with a first mating portion at said inner cylindrical surface;

a plurality of separate and distinct, radially movable hub members circumferentially arranged inside said center hole, said hub members cooperatively defining a hub structure extending radially from a rotational axis of said hub structure by a predetermined angular pitch, for retaining said inner cylindrical surface of said recording medium;

said hub members each having a free first end and a fixed second end, said free end being flexibly movable inwardly toward said rotational axis; and said hub members each being provided with a second mating portion at a location opposed to said first mating portion;

wherein said hub members support said recording medium by fitting said second mating portion of said hub members into said first mating portion of said recording medium;

wherein said first mating portion is a groove cut along said inner cylindrical surface of said recording medium, and said second mating portion is a protrusion on said hub members.

8. A disk assembly as recited in claim 7, wherein walls of said protrusion are tapered at a first angle.

9. A disk assembly, comprising:

at least one recording medium having a center hole;

said center hole defining an inner cylindrical surface;

said recording medium being provided with a first mating portion at said inner cylindrical surface;

a plurality of separate and distinct, radially movable hub members circumferentially arranged inside said center hole, said hub members cooperatively defining a hub structure extending radially from a rotational axis of said hub structure by a predetermined angular pitch, for retaining said inner cylindrical surface of said recording medium;

said hub members each having a free first end and a fixed second end, said free end being flexibly movable inwardly toward said rotational axis;

said hub members each being provided with a second mating portion at a location opposed to said first mating portion;

wherein said hub members support said recording medium by fitting said second mating portion of said hub members into said first mating portion of said recording medium;

wherein said recording medium comprises a plurality of disks, each said disk being provided with a first mating portion at said inner cylindrical surface; and said hub members each being provided with a second mating portion at locations corresponding and opposed to each said first mating portion.

10. A disk drive, comprising:

a disk as a recording medium, said disk having a center hole;

a disk spindle for supporting and rotating said disk at said center hole;

a head;

a head actuator for supporting and moving said heads;

recording means, operatively connected to said head, for recording data to said disk; and reproducing means, operatively connected to said head, for reproducing data from said disk;

wherein said disk has a first mating portion at an inner cylindrical surface defined by said center hole; and wherein said disk spindle has a plurality of separate and distinct hub members circumferentially arranged inside said center hole, cooperatively defining a hub structure, each of said hub members being radially movable outwardly, said hub members each having a free first end and a fixed second end, said free end being flexibly movable inwardly toward said rotational axis, each said hub member being provided with a second mating portion at a location opposed to said cylindrical surface of said disk, said hub members supporting said disk by fitting said second mating portion into said first mating portion of said disk when said hub members are moved outwardly.

11. A disk drive, comprising:

at least one recording disk having a center hole; and hub means for holding and rotating said disk at said center hole, said hub means having a rotational axis and a cylinder portion provided with a circular groove, said cylinder portion being formed of at least three separate and distinct hub members said hub members being fixed at one end and free at the other end so as to be flexibly movable inwardly toward said rotational axis at said other end, said cylinder portion having an outer diameter which is smaller than an inner edge of said center hole when said hub members are radially flexibly moved towards said rotational axis of said hub means, said circular groove fitting with said center hole when said hub members are radially flexibly extended.

12. A disk drive recited in claim 11, wherein said hub means has a first tapered surface; and said structure further comprises extending means having a second tapered surface so as to fit with said first tapered surface of said hub structure, said extending means expanding said hub members when said extending means is axially pushed towards said cylinder portion.

13. A disk drive as recited in claim 11, wherein said disk has a first surface, said edges of said center hole being chamfered with a first angle with respect to said surface of said disk.

14. A disk drive as recited in claim 13, wherein said grooves have inner walls which are tapered at said first angle.

15. A disk drive as recited in claim 11, wherein said center hole has edges which are square.

16. A disk drive as recited in claim 11, wherein said groove has round edges, said center hole contacting said round groove.

17. A disk drive as recited in claim 11, wherein said recording medium comprises a plurality of disks.

18. A disk drive, comprising:

at least one recording disk having a center hole formed by an inside edge of said disk, said edge having a groove;

hub means for holding and rotating said disk at said center hole, said hub means having a rotational axis and a cylinder portion provided with a circular protrusion to fit into said groove, said cylinder portion being formed of at least three hub members separated along imaginary planes extending radially from said rotational axis, said hub members being fixed at one end and free at the other end so as to be movable inwardly toward said rotational axis at said other end, said cylinder portion having an outer diameter which is smaller than said center hole when said hub members are radially moved towards said rotational axis of said hub means, said circular protrusion fitting with said groove when said members are radially extended.

19. A disk drive as recited in claim 18, wherein said cylinder portion has a first tapered surface; and said disk drive further comprises extending means having a second tapered surface so as to fit with said first tapered surface of said cylinder portion, said extending means expanding said hub members when said extending means is axially pushed towards said cylinder portion.

20. A disk drive as recited in claim 18, wherein said disk has a first surface, and walls of said groove are tapered with a first angle with respect to said first surface of said disk.

21. A disk drive as recited in claim 20, wherein said circular protrusion is tapered with said first angle.

* * * * *

UNITED STATES PATENT AND TRADEMARK OFFICE
CERTIFICATE OF CORRECTION

PATENT NO. : 5,715,114
DATED : February 3, 1998
INVENTOR(S) : Tsutomu Gotou

It is certified that error appears in the above-identified patent and that said Letters Patent is hereby corrected as shown below:

Title page,

Under "[75] Inventor" delete "Hagashine"

and insert --Higashine-- therefor

Signed and Sealed this

Ninth Day of February, 1999

Attest:

Attesting Officer

*Acting Commissioner of Patents and Trademarks*